United States Patent

[11] 3,583,555

| [72] | Inventors | George E. Karsnak;<br>Robert C. Sasena, 1935 Lincoln Way, both of, McKeesport, Pa. 15131 |
|---|---|---|
| [21] | Appl. No. | 795,429 |
| [22] | Filed | Jan. 31, 1969 |
| [45] | Patented | June 8, 1971 |

[54] CLEANING APPARATUS FOR CONVEYOR BELTS OR THE LIKE
7 Claims, 7 Drawing Figs.

[52] U.S. Cl. ................................................. 198/230, 15/256.5
[51] Int. Cl. ..................................................... B21b 45/02, B65g 45/00
[50] Field of Search........................................... 198/230; 15/77, 102, 182, 256.5

[56] References Cited
UNITED STATES PATENTS

| 766,013 | 7/1904 | Baldwin....................... | 198/230 |
| 1,543,411 | 6/1925 | Wittig............................ | 198/230X |
| 1,888,498 | 11/1932 | Gipe.............................. | 15/77 |
| 2,016,186 | 10/1935 | Vail............................... | 15/77X |
| 3,161,285 | 12/1964 | Hummer....................... | 198/230 |

*Primary Examiner*—Edward A. Sroka
*Attorney*—Clarence A. O'Brien and Harvey B. Jacobson

ABSTRACT: An endless conveyor belt treated and cleaned by a contacting roller rotated at a higher peripheral speed than the belt. Helical formations on the roller having spaced, serrated land surfaces engage the belt to remove loosely adhering matter while treating fluid is conducted through the roller drive shaft and discharged into the belt from passages extending radially through the hub portion of the roller from which the helical formations project.

PATENTED JUN 8 1971

George E. Karsnak
Robert C. Sasena
INVENTORS

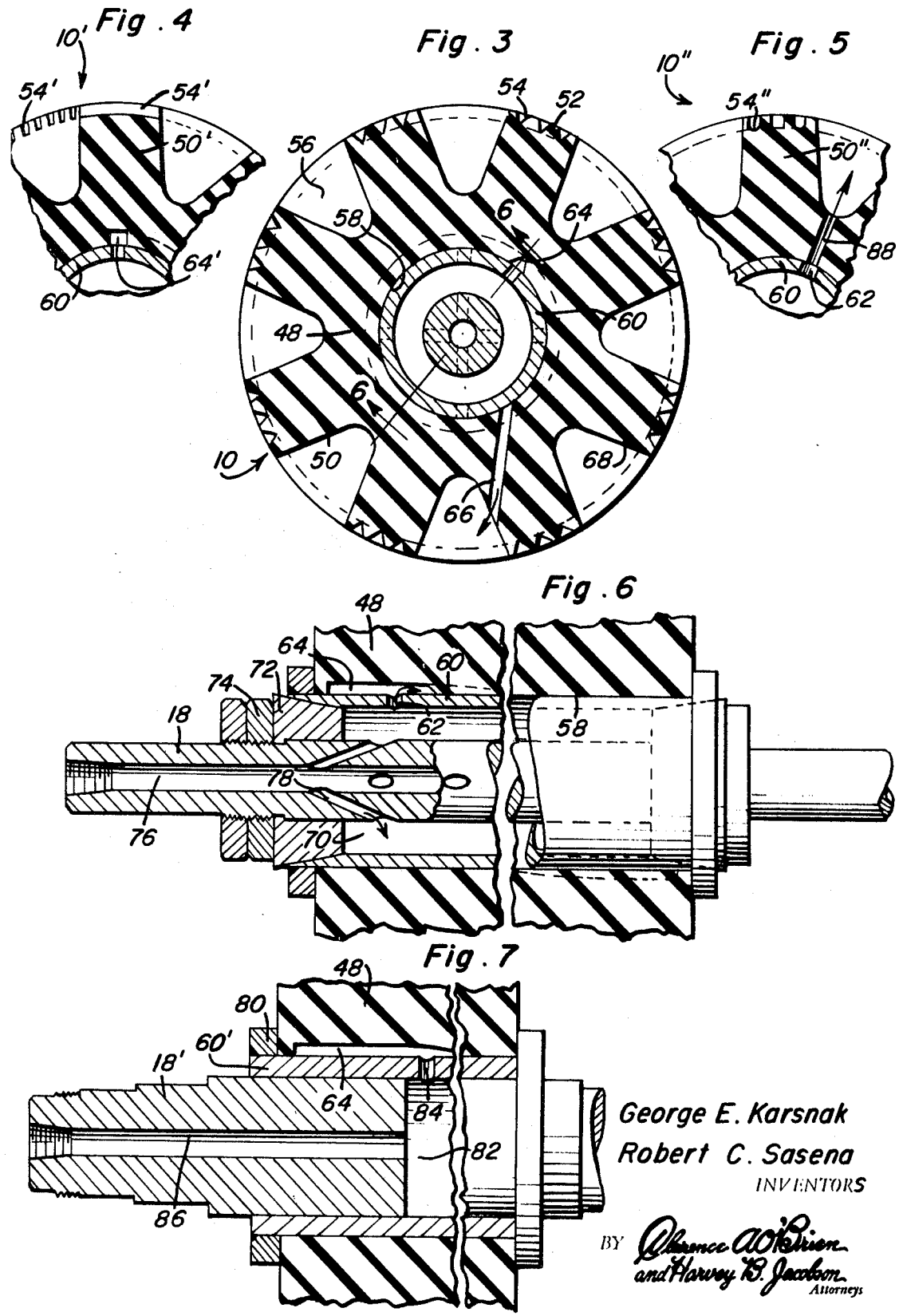

CLEANING APPARATUS FOR CONVEYOR BELTS OR THE LIKE

This invention relates to the cleaning and treating of conveyor belt material while the conveyor is in operation.

Conveyor belts for materials such as coal, coke, chemicals, crushed stone, sand and the like continuously collect and retain residue matter after discharge which is carried over along the return section of the conveyor belt. A portion of this carryover material is deposited onto idler and support pulleys as well as other adjacent mechanism to create maintenance problems and high operating costs. Thus, various cleaning devices have been used for removal of carry over matter from the conveyor belt immediately following the material discharge location on the conveyor belt. These cleaning devices include brushing mechanism, scrapers, flexible tip blades, rotary drums with flexible fins, etc. Although the latter belt-cleaning devices have been successful to some extent, they have not completely solved the problem with the desired degree of satisfaction. In particular, such prior cleaning devices have required frequent removal or replacement in order to unload the debris collected thereon. Furthermore, such prior cleaning devices when positioned in contact with a conveyor belt material for effective cleaning thereof, have caused undesirable abrasion and wear of the conveyor belt material.

An important object of the present invention is to provide a self-cleaning roller of a particular configuration and operational relationship to the conveyor belt so as to effectively remove loosely adhering matter from the belting. Further, abrasion of the belting material by either the surfaces of the cleaning roller or by any dirt collected thereon, is minimized.

In accordance with the present invention, a cleaning roller made preferably of a polyurethane material but also capable of being made of other materials such as rubber, neoprene, metal, ceramics, or combinations of the foregoing materials, is rotatably mounted about an axis parallel to the head pulley about which the conveyor belt is entrained for contact with the conveyor belt closely spaced from the material discharge location. The cleaning roller is driven by power-operated mechanism so as to impart rotation thereto at a peripheral speed which is two to four times the linear speed of the conveyor belt, the roller being rotated in a direction opposite to conveyor belt movement. The cleaning roller itself is provided with a plurality of circumferentially spaced helical formations, the spaced land surfaces of which are projected through the belting material as the roller is rotated at its relatively higher peripheral speed in order to remove loosely adhering matter. The land surface portions are relatively rigid for "squeegee" and scraping action. Also, the space between the helical formations are such as to unload any dirt removed from the belting. Passages are also formed in the hub portion of the roller for conducting treating fluid to the belting as it comes in contact with the cleaning roller, the treating fluid being conducted through the drive shaft to the cleaning roller for this purpose. The cleaning fluid may be in the form of air, water, lubricant, coating fluid, etc. The conveyor belts cleaned and treated in accordance with the present invention are of the flat endless type made of materials such as natural rubber, neoprene, synthetic resins, fabric, cordage, steel fibers, and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged transverse sectional view taken substantially through a plane indicated by section line 3–3 in FIG. 2.

FIG. 4 is a partial transverse sectional view showing a modification of the cleaning roller shown in FIG. 3.

FIG. 5 is a partial transverse sectional view showing a second modification of the cleaning roller shown in FIG. 3.

FIG. 6 is an enlarged partial sectional view taken substantially through a plane indicated by section line 6–6 in FIG. 3.

FIG. 7 is a partial sectional view similar to FIG. 6 showing a modification thereof.

Figure 1:
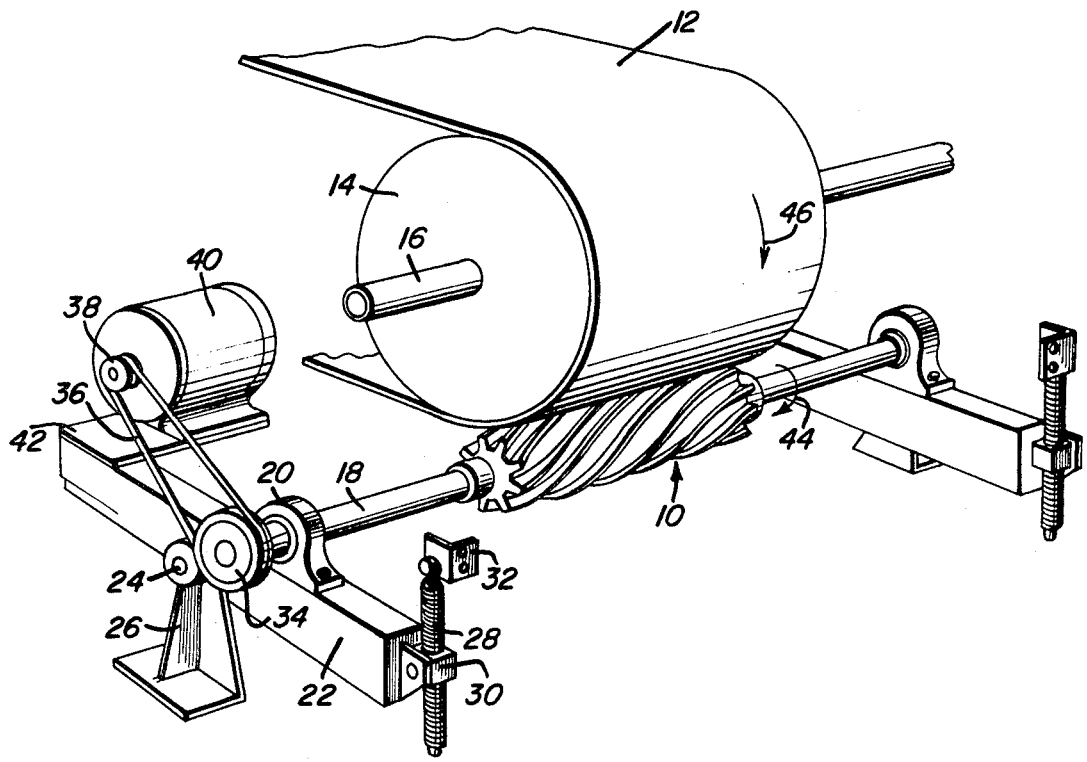
FIG. 1 is a perspective view showing a typical installation for the present invention.

Referring now to the drawings in detail, FIG. 1 shows a typical cleaning roller generally denoted by reference numeral 10 which is constructed in accordance with the present invention for operative contact with an endless, flat type of material handling conveyor belt 12 entrained about a head pulley 14 rotatably mounted about a fixed axis by the pulley shaft 16. The cleaning roller is mounted on a drive shaft 18 the rotational axis of which is parallel to the axis of the pulley 14. The drive shaft is rotatably mounted adjacent opposite axial ends by a pair of journal assemblies 20 respectively mounted on a pair of support arms 22. The support arms are thus interconnected and are pivotally mounted by means of a pivot shaft 24 fixed between a pair of mounting brackets 26. Thus, the cleaning roller is positioned for contact with the belt 12 at a location closely spaced from the point at which material carried by the conveyor belt is discharged. Furthermore, the cleaning roller is held in contact with the belt with a control pressure determined by a pair of tension spring assemblies 28 connected to the ends of the support arms 22 by the brackets 30, the tension springs being anchored at fixed locations by means of the anchor brackets 32.

Connected to one end of the drive shaft 18, is a drive pulley 34 about which a drive belt 36 is entrained. The drive belt is entrained about a motor pulley 38 driven by a prime mover such as the motor 40. In the illustrated embodiment, the motor 40 is mounted on a plate 42 secured to the end of one of the support arms 22 on the side of the pivot shaft 24 opposite the tension spring 28. The motor is driven in such a direction as to impart clockwise rotation to the cleaning roller as indicated by the arrow 44 in FIG. 1, opposite to the direction of the conveyor belt movement as indicated by the arrow 46. Further, the cleaning roller is driven at a rotational speed corresponding to a peripheral speed which is two to four times as great as the linear speed of the conveyor belt. Thus, the cleaning roller sweeps through the material of the conveyor belt with a scraping and squeegee action to effectively remove loosely adhering matter from the belt material just before it begins movement along the lower return section of the conveyor.

Figure 2:
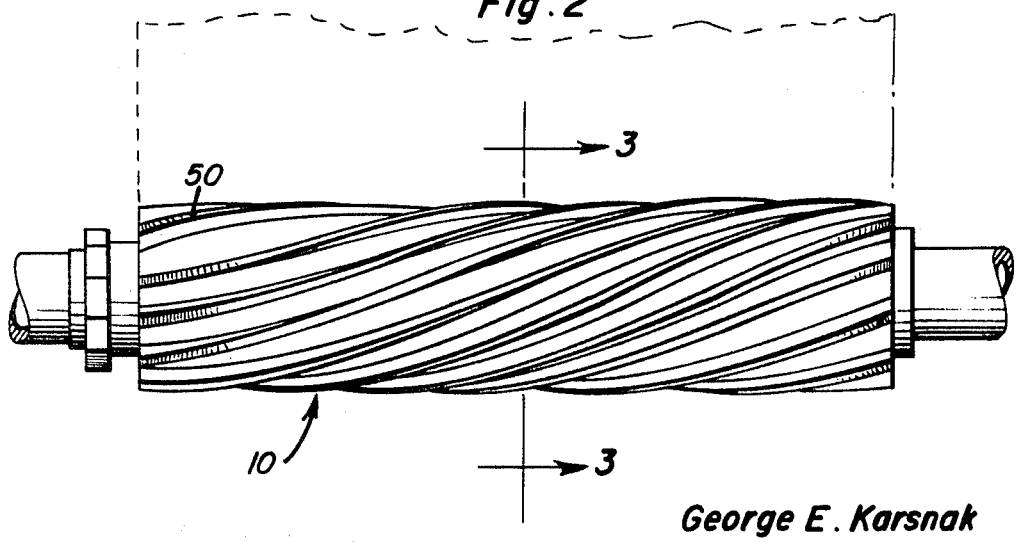
FIG. 2 is a front elevational view of the cleaning roller component of the present invention.

Referring now to FIGS. 2 and 3 in particular, it will be observed that the cleaning roller which is preferably made of a polyurethane material, includes a radially inner hub portion 48 from which a plurality of circumferentially spaced, helical formations 50 project. The number of helical formations and the helix angles thereof, is selected in accordance with the relative speed of the roller and the belt for optimum cleaning action with a minimum amount of abrasion. The radially outer land surfaces 52 of each projection are serrated by means of longitudinal collection grooves 54 for example within which dirt removed from the belt is entrapped and displaced from the belt. Further, it will be noted that the spacing between the formations 50, are in the form of smooth surfaced, V-shaped grooves 56. The angle between the converging sides of each groove 56 is such as to effectively unload the cleaning roller of debris displaced from the belt material.

The serrations in the land surfaces 52 are shown to be in the form of the V-shaped longitudinal slots 54 in FIG. 3. It will also be noted, that the radially inner internal surface 58 of the cleaning roller is mounted on a tubular shaft 60 having openings 62 formed therein as more clearly seen in FIG. 6 The openings 62 are aligned with V-shaped manifold grooves 64 formed in the internal surface 58 of the cleaning roller. The manifold grooves 64 extend helically along the surface 58 and communicate with passages 66 as shown in FIG. 3 that extend radially through the hub portion 48 of the roller so as to conduct fluid to the sides 68 of some of the formations 50 within the grooves 56 from which the fluid is discharged into the belt material. In this manner, the conveyor belt may be treated by a flow of air, cleaning fluid, coating fluid, lubricant or some other surface protecting fluid.

In one form of the invention illustrated in FIG. 6, the belt-treating fluid is supplied to an annular space 70 formed between the tubular shaft 60 and the drive shaft 18. The tubular shaft 60 is therefore axially fixed on the drive shaft between a pair of wedging collars 72 which bear against the locknuts 74 threadedly mounted on the drive shaft. A fluid-conducting bore 76 is formed within the drive shaft so that the treating fluid may be introduced from one end of the shaft into the space 70 through a plurality of connecting bores 78 formed within the drive shaft between the space 70 and the central bore 76 of the drive shaft.

FIG. 7 illustrates a modification wherein a somewhat different drive shaft construction is utilized. The drive shaft consists of a pair of shaft sections 18' which are interconnected with a tubular shaft section 60' on which the hub portion 48 of the roller is held in axially fixed position between the thrust collars 80. The internal manifold grooves 64 are in fluid communication with an axial space 82 through openings 84 formed in the tubular shaft 60'. The space 82 is disposed between the shaft sections 18', one of which is provided with a bore 86 through which fluid under pressure is introduced to the space 82.

FIG. 4 illustrates a modified form of cleaning roller 10' which is similar to the cleaning roller hereinbefore described except that the formations 50' are provided with axially spaced collection grooves 54' which extend across the land surfaces of the formations in intersecting relation to the helix line. Also, a cross-sectionally rectangular manifold groove 64' is formed within the cleaning roller 10' through which fluid communication is established with the radial passages formed in the hub portion of the cleaning roller.

FIG. 5 illustrates another modification in a cleaning roller generally referred to by reference numeral 10'' having radial passages 88 to conduct fluid under pressure to the bottom of the V-grooves between the formations 50'' which are provided with helically extending grooves 54'' differently shaped than the grooves 54 associated with the cleaning roller illustrated in FIG. 3.

It will be appreciated, that the type of radial passages formed in the hub portion of the cleaning roller and the type of serrations in the land surfaces of the helical formations will depend upon the type of conveyor belt material being treated. However, the basic principles are the same. The land surfaces contact the belt material for cleaning thereof by the "squeegee" and scraping action aforementioned. The width of the lands and the rigidity of the formations are designed toward this end. The serration grooves collect the debris and carry it away from the belt to minimize abrasion of the belt material as the roller rotates at a peripheral speed greater than the linear speed of the belt. At the same time, treating fluid may be introduced into the belt material if desired. Debris displaced from the belt material will be unloaded from the cleaning roller in view of the release angle of the converging sides 68 of the grooves 56. Also, the formations will flex to some extent in view of the elasticity of the material from which the cleaning roller is made in order to withstand the relatively high belt to roller pressures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. In combination with a flexible belt entrained about a pulley, a flexible, resilient cleaning roller rotatably mounted about a rotational axis substantially parallel to that of the pulley, pressure-controlled means mounting the roller for rotation in peripheral contact with the belt, and drive means drivingly connected to the roller for imparting rotation thereto in a direction opposite to movement of the belt, said cleaning roller including a hub portion and a plurality of circumferentially spaced continuous helical formations projecting radially from the hub portion forming helical grooves therebetween, said hub portion having a radially inner manifold groove and passages extending radially outward from the manifold groove, and said formations having radially outer serrated land surfaces of limited contact area engageable with the belt, said drive means including a shaft connected to the roller, and passage means extending through the shaft in fluid communication with the manifold groove for discharging fluid through the passages in the hub portion of the formations onto the belt.

2. The structure as defined in claim 1 wherein said helical grooves are substantially V-shaped in cross-sectional configuration with a rounded bottom surface and diverging sidewalls with the peripheral width of the outer end of each helical groove being generally equal to the peripheral width of the helical formations whereby material displaced from the belt will be effectively unloaded from the grooves during rotation of the roller.

3. The structure as defined in claim 2 wherein said passages extending radially outwardly from the manifold groove terminate in the sidewall of certain of said V-shaped grooves.

4. The structure as defined in claim 2 wherein said passages extending radially outward from the manifold groove terminating in the bottom of said V-shaped grooves.

5. The structure as defined in claim 2 wherein said serrated land surfaces each includes a plurality of longitudinally extending collection grooves of substantially V-shaped configuration.

6. The structure as defined in claim 2 wherein said land surfaces each includes a plurality of peripherally extending collection grooves which extend across the land surface of the formations in intersecting relation to the helical grooves between the helical formations.

7. The structure as defined in claim 2 wherein said passage means in the shaft including a plurality of longitudinally inclined radial bores communicating the exterior of the shaft with a longitudinal passageway extending therethrough, the hub portion of the roller including a tubular sleeve defining the inner surface of the manifold groove and spaced concentrically from the shaft, said sleeve having radial apertures therein communicating the manifold groove with the space between the shaft and sleeve.